United States Patent [19]

Waddill

[11] 3,875,072

[45] Apr. 1, 1975

[54] PIPERAZINE AND ALKANOLAMINE ACCELERATOR FOR EPOXY CURING

[75] Inventor: Harold George Waddill, Austin, Tex.

[73] Assignee: Jefferson Chemical Company, Inc., Houston, Tex.

[22] Filed: Mar. 9, 1973

[21] Appl. No.: 339,608

[52] U.S. Cl. ............. 252/182, 260/2 N, 260/47 EN
[51] Int. Cl. ..................... C08g 30/14, C08g 51/84
[58] Field of Search ......... 252/182; 260/2 N, 47 EN

[56] References Cited
UNITED STATES PATENTS

| | | | |
|---|---|---|---|
| 3,456,035 | 7/1969 | Endors et al. | 260/47 EN |
| 3,639,928 | 2/1972 | Bentley et al. | 260/47 EN |
| 3,793,271 | 2/1974 | Godfrey et al. | 260/47 EN |

Primary Examiner—Benjamin R. Padgett
Assistant Examiner—Irwin Gluck
Attorney, Agent, or Firm—James L. Bailey; John R. Kirk, Jr.; Terrence D. Dreyer

[57] ABSTRACT

Epoxy resins, of the polyglycidyl ether of a polyhydric phenol type, are cured by incorporating therein a polyoxyalkylenepolyamine and an accelerator combination of piperazine and an alkanolamine, the combination having a combined weight ratio of between about 1:8 to 1:1. The accelerator combination is synergistic for accelerating the curing of a polyglycidyl ether of a polyhydric phenol cured with a polyoxyalkylenepolyamine at ambient or elevated temperatures. The epoxy resin products are useful in protective coatings, adhesives, seamless and terrazzo flooring, castings, laminates, and in grouting, potting, encapsulating, caulking and sealing compositions.

4 Claims, No Drawings

PIPERAZINE AND ALKANOLAMINE ACCELERATOR FOR EPOXY CURING

BACKGROUND OF THE INVENTION

1. Field of the Invention

This invention relates to an improved process for curing epoxy resins and the resin product thus produced.

2. Description of Prior Art

U.S. Pat. No. 3,467,393 to Legler (1969) teaches the use of a polyoxyalkylenepolyamine for curing a polyglycidyl ether of a polyhydric phenol. Homan's U.S. Pat. No. 2,783,214 (1957) discloses the curing of an epichlorohydrin-bisphenol resin-forming material at ambient temperature with a specific mixture of amines, i.e., a major amount of triethylene tetramine and a minor amount of triethanolamine, in the presence of a highly reactive substance which will polymerize spontaneously in the presence of the stated amines.

In several applications, accelerated curing of epoxy resins at ambient temperatures is essential. A typical situation is the use of an epoxy resin as an adhesive in a flammable environment. Many known prior art processes for preparing low temperature cured epoxy resins are disadvantageous inasmuch as the resultant epoxy resins have inferior physical properties, e.g., brittleness, loss in resistance to water absorption, strength, and the impairment of electrical properties. On the other hand, epoxy resins of the polyglycidyl ether of a polyhydric phenol type cured with a polyoxyalkylenepolyamine exhibit superior physical properties. However, curing with polyoxyalkylenepolyamines at ambient temperatures is too slow for use in many applications.

There are a few prior art processes known for accelerating the cure of epoxy resins cured with a polyoxyalkylenepolyamine. For example, Lee, Henry and Neville, Kris, Handbook of Epoxy Resins, McGraw-Hill Book Co., N.Y., 1967, p. 7–14, describes the use of N-(2-aminoethyl)piperazine as an epoxy curing agent accelerator. U.S. Pat. No. 3,639,928 to Bentley et al. discloses a process for accelerating the curing of epoxy resins cured with a polyoxyalkylenepolyamine by incorporating therein an accelerator mixture of N-(3-aminopropyl)piperazine and salicylic acid. However, known prior art processes and accelerators still appear to be too slow for many applications of epoxy resins requiring cures at ambient temperatures. On the other hand, it has been found that epoxy resins can be cured at ambient temperature with a polyoxyalkylenepolyamine in very short periods of time by using an accelerator combination of the instant invention with the polyoxyalkylenepolyamine.

SUMMARY OF THE INVENTION

The invention is an improved process for curing epoxy resins of the polyglycidyl ether of a polyhydric phenol type which are cured with a polyoxyalkylenepolyamine and the accelerator combination therefor. The rate of cure of the epoxy resins with the polyoxyalkylenepolyamine is rapidly accelerated by the use of an accelerator combination of piperazine and an alkanolamine, wherein the accelerator combination has a weight ratio of about 1:8 to 1:1 piperazine to alkanolamine. The cured epoxy resin products are useful in protective coatings, adhesives, seamless and terrazzo flooring, and as castings, potting, encapsulating, grouting, caulking and sealing compositions and like applications wherein accelerated curing is convenient or essential.

DESCRIPTION OF THE PREFERRED EMBODIMENTS

More particularly, the instant invention is an improved process for accelerating the curing of a polyglycidyl ether of a polyhydric phenol cured with a polyoxyalkylenepolyamine which comprises the steps of combining with a polyglycidyl ether of a polyhydric phenol, a polyoxyalkylenepolyamine and an accelerator combination of piperazine and an alkanolamine, said combination having a weight ratio of about 1:8 to 1:1 piperazine to alkanolamine, and allowing the mixture to cure and the resins obtained therefrom. Examples of the types of polyglycidyl ethers of polyhydric phenols to which the invention is applicable include the diglycidyl ether of isopropylidenediphenol and its congeners.

Polyoxyalkylenepolyamines of the formula;

where R is a hydrocarbon radical, A is an alkylene radical having from two to four carbon atoms, $x$ has an average value from 1 to 10, and $y$ is an integer from 2 to 4 representing the valence of R, are useful in the practice of the instant invention. Preferred examples of the polyoxyalkylenepolyamines include polyoxypropylene diamines of the formula;

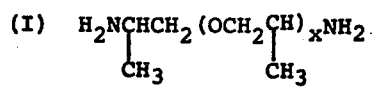

where $x = 2$ to 40, polyoxypropylene triamines of the formula;

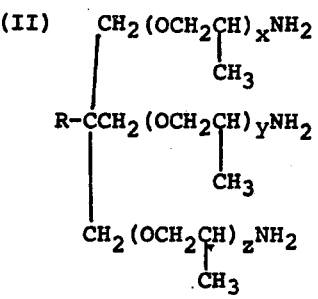

where R is a lower alkyl and $x + y + z = 3$ to 40, and polyoxypropylene diamines of the formula;

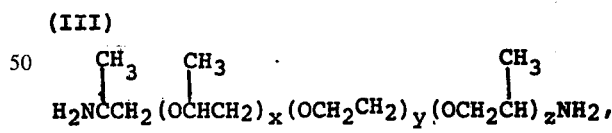

where $x + z = 2$ to 10 and $y = 1$ to 50.

Examples of preferred alkanolamines useful in the invention include mono-, di- and triethanolamine, hydroxy ethoxyethylamine, N-aminoethylethanolamine, N, N bis (hydroxypropyl), N-hydroxyethylamine, and the like.

The particular order of mixing of the above described components is not critical in the practice of the instant invention. For example, the polyoxyalkylenepolyamine, piperazine and alkanolamine components may be blended in any desired order or manner to provide a homogenous mixture of accelerated curing agents. The mixture may then be incorporated into or mixed with the above described resin component at time of use to give an accelerated self-curing resin at ambient temperature.

In a preferred method of practicing the invention, the piperazine and alkanolamine components are first blended. The blend is then added to the polyoxyalkylenepolyamine component and this overall mixture is finally admixed with the above-described resin component at time of use. The blend of piperazine and alkanolamine component is capable of being stored for long periods of time, if desired.

It is essential in the practice of the instant invention that the accelerator combination of piperazine and alkanolamine components be utilized in a weight ratio of between about 1:8 to about 1:1 piperazine to alkanolamine. I have found that the utilization of these components within the described combined weight ratio is highly synergistic for accelerating the self-curing of the above-described epoxy resin types cured with said polyoxyalkylenepolyamines at ambient temperature. Accordingly, experiments have shown that where piperazine or an alkanolamine is utilized alone, or where the weight ratio of the components is without the prescribed range, the rate of curing at ambient temperature is drastically reduced.

The combined weight of piperazine and alkanolamine components present when mixed with the polyoxyalkylenepolyamine may range from about 1 to 100 parts by weight per 100 parts by weight of the polyoxyalkylenepolyamine. The optimum amount may vary somewhat for a given application depending upon the particular epoxy resin, polyoxyalkylenepolyamine and alkanolamine being utilized, and is best determined empirically for the most effective amount.

In the curing of epoxy resins, the curing-hardening agent is usually added in an amount that will provide one reactive —NH in the combined hardener-curing components for each epoxy group in the epoxy resin component. These are known in the art as stoichiometric quantities. Usually the stoichiometric quantities can be calculated from a knowledge of the chemical structure and analytical data on the particular components being utilized. However, many times the stoichiometric quantity is found empirically. A particular example of such a method is measuring the maximum exotherm temperature during the curing of the epoxy resin at different hardening-curing agent concentrations. A graph of the exotherm temperature vs. the concentration of hardening-curing agent will exhibit a maximum at or near the stoichiometric quantity.

For the purposes of the instant invention, the stoichiometric amount of the hardening-curing agent is calculated by adding together the number of equivalents on the basis of weight per replaceable —NH group in the polyoxyalkylenepolyamine, piperazine and alkanolamine components utilized. Preferably, these components are utilized in amounts that will provide up to 10 percent excess of the stoichiometric amount.

Should fire retardance be required for the epoxy resins cured by the process and composition of the present invention, it will be understood that various fire retardants for epoxy resins in compositions known in the art can be utilized without departing from the intended scope of the invention. Experiments have shown that well known epoxy resin fire retardants, for example, various halogenated compounds, phosphate compounds, even including piperazine phosphate, and the like, can be utilized in effective amounts in the above-described inventive process without affecting the synergistic effect of the accelerator combination of piperazine and alkanolamine components upon the accelerated curing rate. Preferably, where fire retardance is desirable, an effective amount of piperazine phosphate is incorporated into the above-described mixture of epoxy resin, polyoxyalkyleneamine, and accelerator combination. Accordingly, the piperazine phosphate may be added at any time during the mixing of the components without affecting the described synergistic effect.

The above-described mixture of epoxy resin, polyoxyalkylenepolyamine, and accelerator combination of piperazine and alkanolamine is also preferably allowed to self-cure at ambient room temperatures of between about 0° to about 45° C. However, the mixture can be cured or post-cured at elevated temperatures up to about 175° C., if desirable and convenient.

The following Examples and Tables illustrate the practice of the invention in more detail but are not to be construed as limitative.

EXAMPLES 1-4

The epoxy resin formulations set forth in the following Table 1 were prepared in separate containers at room temperature (about 25° C.). Equal amounts of epoxy resin for each example were mixed with stoichiometric amounts of the curing agent consisting of a polyoxyalkylenediamine either with or without an additional accelerator component. The gel time or time required for a solid to begin forming was noted in each case. A portion of each formulation was coated on a steel test panel by means of a 6-mil applicator blade, and allowed to cure at room temperature. The times required to reach the set-to-touch (STT) and through-dry (TD) stages of cure, as determined by a Gardner circular drying time recorder, were also noted. As illustrated by the gel time and drying time of Example 4 the accelerator combination of piperazine and alkanolamine is strongly synergistic for accelerating the rate of cure of the epoxy resin cured with polyoxyalkylenepolyamine. Accordingly, the accelerator combination of triethanolamine and piperazine was over twice as effective as either agent alone in producing the gel time.

TABLE 1

| Ex. No. | Grams | | | | Gel Time Min. | STT Hrs. | TD Hrs. |
|---|---|---|---|---|---|---|---|
| | ER[1] | D-230[2] | TEA[3] | P[4] | | | |
| 1 | 100 | 30 | — | — | 295 | 9.0 | 12.5 |
| 2 | 100 | 30 | 6.3 | — | 41.5 | 5.6 | 8.1 |
| 3 | 100 | 27.4 | — | 2.3 | 82.5 | 19.0 | 23.0 |
| 4 | 100 | 27.4 | 5.4 | 2.3 | 17.0 | 4.0 | 6.2 |

[1]Diglycidyl ether of isopropylidenediphenol having an equivalent weight per epoxide of 191.
[2]Jeffamine" product manufacture by Jefferson Chemical Company, Inc., a polyoxypropylenediamine of structure I having an average molecular weight of about 230 and an equivalent weight per active hydrogen of about 58.
[3]Triethanolamine
[4]Piperazine

EXAMPLES 5-8

Epoxy resin formulations in Table 2 were prepared in accordance with the procedure set forth in Examples 1-4. The gel times were noted in each case. The strongly synergistic effect of the accelerator combination of piperazine and triethanolamine is again illustrated by Example 8.

TABLE 2

| Ex. No. | Grams | | | | Gel Time Min. |
|---|---|---|---|---|---|
| | ER[1] | D-400[2] | TEA[3] | P[4] | |
| 5 | 100 | 55 | — | — | >300 |
| 6 | 100 | 55 | 8.9 | — | 68.0 |
| 7 | 100 | 46.7 | — | 3.4 | >90 |
| 8 | 100 | 46.7 | 7.9 | 3.4 | 16.5 |

[1]Same as in Table 1
[2]Jeffamine product, a polyoxypropylenediamine of structure I having an average molecular weight of about 400 and an equivalent weight per active hydrogen of about 105.
[3]Triethanolamine
[4]Piperazine

EXAMPLES 9-12

The epoxy resin formulations in the following Table 3 were also prepared in accordance with the process in Examples 1-4 at room temperature with the gel times being noted. Example 12 further illustrates the accelerated curing rate of the epoxy resin cured with the polyoxyalkylenepolyamine obtained by incorporating therein the accelerator combination of piperazine and diethanolamine.

TABLE 3

| Ex. No. | Grams | | | | Gel Time Min. |
|---|---|---|---|---|---|
| | ER[1] | D-230[2] | DEA[3] | P[4] | |
| 9 | 100 | 30 | — | — | 295 |
| 10 | 100 | 30 | 10.5 | — | 21.2 |
| 11 | 100 | 27.4 | — | 2.3 | 82.5 |
| 12 | 100 | 27.4 | 9.0 | 2.3 | 13.5 |

[1]Same as Table 1
[2]Sames as Table 1
[3]Diethanolamine
[4]Piperazine

EXAMPLES 13-16

Epoxy resin formulations in Table 4 were prepared per Examples 1-4 except that a fire retardant, piperazine phosphate monohydrate, was incorporated therein. The gel time of each formulation was noted. As illustrated in Example 16, the strongly synergistic effect of the piperazine and triethanolamine accelerator combination is not affected whatsoever by the presence of the flame retardant component in the formulation.

TABLE 4

| Ex. No. | Grams | | | | | Gel Time Min. |
|---|---|---|---|---|---|---|
| | ER[1] | T-403[2] | TEA[3] | P[4] | PP[5] | |
| 13 | 100 | 41.5 | — | — | 50 | 240 |
| 14 | 100 | 41.5 | 6.3 | — | 50 | 47.5 |
| 15 | 100 | 37.2 | — | 2.3 | 50 | 118.5 |
| 16 | 100 | 37.2 | 5.4 | 2.3 | 50 | 24.7 |

[1]Same as in Table 1
[2]Jeffamine product, a polyoxypropylenediamine of structure I having an average molecular weight of about 400 and an equivalent weight per active hydrogen of about 80.
[3]Triethanolamine
[4]Piperazine
[5]Piperazine phosphate monohydrate, a flame retardant.

EXAMPLES 17-20

The epoxy resin formulations in the following Table 5 were prepared in accordance with the process of Examples 1-4, the gel times being noted. Example 20 shows the synergistic accelerated curing rate produced by the combination of piperazine and the 2 mol propylene oxide adduct of monoethanolamine.

TABLE 5

| Ex. No. | Grams | | | | Gel Time Min. |
|---|---|---|---|---|---|
| | ER[1] | D-230[2] | A[3] | P[4] | |
| 17 | 100 | 30 | — | — | 295 |
| 18 | 100 | 30 | 10.5 | — | 38.2 |
| 19 | 100 | 27.4 | — | 2.3 | 82.5 |
| 20 | 100 | 27.4 | 9.0 | 2.3 | 20.7 |

Same as Table 1
Same as Table 1
Reaction product of monoethanolamine (1 mol) and propylene oxide (2 mols); N-N-bis(2-hydroxypropyl) N-hydroxyethyl) amine.
Same as in Table 1

Comparable results to those illustrated in the Tables and Examples set forth hereinabove are obtained by using accelerator combinations within the invention disclosed but not specifically illustrated. Obviously many modifications and variations of the invention as hereinbefore set forth may be made without departing from the spirit and scope thereof, and, therefore, only such limitations should be imposed as indicated in the appended claims.

What is claimed is:

1. As a composition of matter, an accelerator combination that is synergistic for accelerating the curing of a polyglycidyl ether of a polyhydric phenol cured with a polyoxyalkylenepolyamine, said accelerator combination comprising piperazine and an alkanolamine in a combined weight ratio of about 1:8 to about 1:1 piperazine to said alkanolamine.

2. An accelerator combination of claim 1 wherein said alkanolamine is selected from the group consisting of mono-, di-, or triethanolamine, hydroxy ethoxyethylamine, N-aminoethylethanolamine, N,N-bis(hydroxypropyl), N-hydroxyethylamine, and mixtures thereof.

3. An accelerator combination of claim 1 wherein the alkanolamine is triethanolamine.

4. An accelerator combination of claim 1 wherein the weight ratio of piperazine to triethanolamine is about 1:4 to 1:2.

* * * * *